United States Patent [19]

Marchand et al.

[11] Patent Number: 5,080,696
[45] Date of Patent: Jan. 14, 1992

[54] PROCESS AND DEVICE FOR REDUCING THE CONTENT OF GASEOUS ACID POLLUTANTS IN FUMES DISCHARGED FROM AN INCINERATION PLANT

[75] Inventors: Denis Marchand, Marly Le Roi; Philippe Patte, Nancy, both of France

[73] Assignee: Sogea, Rueil Malmaison, France

[21] Appl. No.: 623,005

[22] Filed: Dec. 6, 1990

[30] Foreign Application Priority Data

Dec. 8, 1989 [FR] France .................. 89 16438

[51] Int. Cl.$^5$ ............................................ B01D 53/14
[52] U.S. Cl. ................................ 55/71; 55/73; 55/40; 55/189; 55/222; 55/268
[58] Field of Search ............... 55/71, 73, 80, 89, 268, 55/225, 227, 222

[56] References Cited

U.S. PATENT DOCUMENTS

| | | | |
|---|---|---|---|
| 3,824,767 | 7/1974 | Ford | 55/80 X |
| 4,544,380 | 10/1985 | Itou et al. | 55/80 |
| 4,583,999 | 4/1986 | Lindahl et al. | 55/89 X |
| 4,662,900 | 5/1987 | Ottengraf | 55/90 |
| 4,704,972 | 11/1987 | Merchand | 55/80 X |
| 4,723,968 | 2/1988 | Schippert et al. | 55/80 |

*Primary Examiner*—Charles Hart
*Attorney, Agent, or Firm*—Sughrue, Mion, Zinn, Macpeak & Seas

[57] ABSTRACT

The present invention relates to a process for reducing the content of gaseous acid pollutants soluble in water and contained in fumes discharged from an incineration plant, in the course of which the said fumes are cooled by means of indirect heat exchange with a cold fluid, thus producing a condensate containing acid pollutants, and in which, after this cooling stage, the said fumes still containing acid pollutants are washed using the condensate as washing liquid.

7 Claims, 1 Drawing Sheet

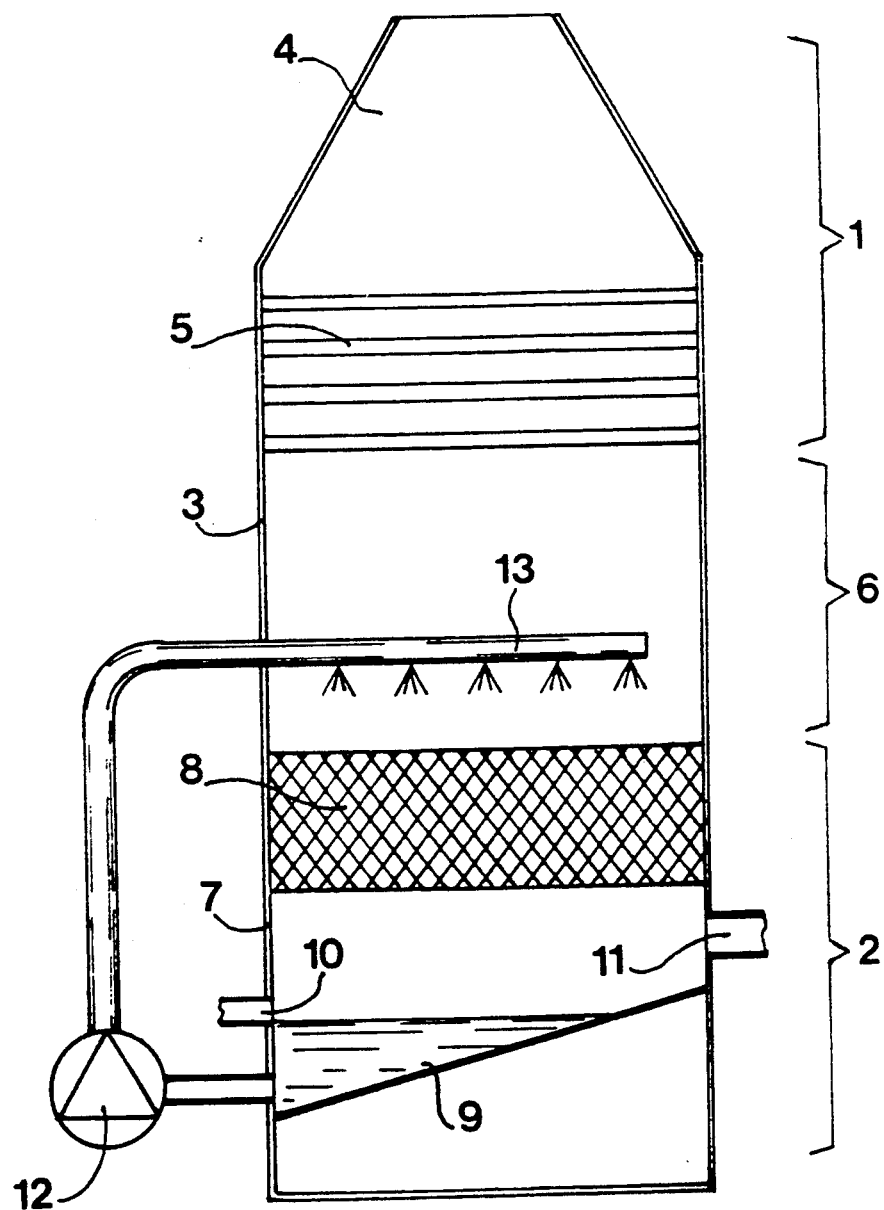

PROCESS AND DEVICE FOR REDUCING THE CONTENT OF GASEOUS ACID POLLUTANTS IN FUMES DISCHARGED FROM AN INCINERATION PLANT

BACKGROUND OF THE INVENTION

The present invention relates to a process and a device for reducing the content of gaseous acid pollutants in fumes discharged from an incineration plant.

More particularly, the present invention relates to a process and a device of the above type for fumes originating from the incineration of household wastes.

Indeed, household wastes contain chlorine, mainly in the form of chlorinated plastic materials, such as polyvinyl chloride (PVC).

Accordingly, the destruction of these products by incineration produces fumes containing gaseous hydrogen chloride HCl in variable proportions, which on average amount to 1.5 gram per standard cubic meter (1.5 g/Nm$^3$).

Environmental protection requires the treatment of fumes discharged from these incineration installations in order to lower the acid pollutant content.

Thus, French Patent 2,592,812 discloses a process and a device for the treatment of fumes originating from incineration of household wastes, in which the fumes, after removal of dusts, undergo a cooling stage before being discharged into the atmosphere, this cooling being carried out by indirect heat exchange with a cold fluid, leading to condensation of the water vapour which is present in these fumes and traps the acid pollutants they contain.

Although this process and this device do indeed make it possible to limit the HCl discharge in these fumes to less than 100 mg/Nm$^3$, levels of less than 50 mg/Nm$^3$, which after all are going to be the new discharge standard, cannot be achieved in a simple and economic manner with them.

Indeed, while this process and this device meet this new requirement in theory, they have to double the exchange surface area of the heat exchangers, and furthermore the fumes would then be saturated with water vapour and consist of liquid vesicles of very small diameter (10 to 50 μm), which are difficult to trap.

This solution can therefore only meet the new discharge requirements if a very large size, and thus expensive, heat exchanger is used, and moreover fumes saturated at ambient temperature and containing liquid vesicles, which can only be trapped by means which are very expensive and difficult to maintain, are emitted.

Furthermore, the more it is desired to lower the gaseous pollutant content in the fumes by this process the more water is condensed and the more HCl is trapped, but the more the acid concentration of the condensate is lowered. Thus, the amount of condensate which subsequently has to be treated is increased.

Moreover, this solution involves an increase in energy consumption, due to the circulation of the cooling fluid, which is circulated at a higher throughput and over a longer distance.

SUMMARY OF THE INVENTION

Accordingly the object of the present invention is to meet this new discharge requirement in a simple and economic manner.

Another object of the present invention is to minimise the volume of acid condensate which subsequently has to be neutralised.

Accordingly, the present invention relates to a process for reducing the content of gaseous acid pollutants soluble in water and contained in fumes discharged from an incineration plant, in the course of which the said fumes are cooled by means of an indirect heat exchanger with a cold fluid, thus producing a condensate containing acid pollutants, and in which, after this cooling stage, the said fumes still containing acid pollutants are washed using the condensate as washing liquid.

The present invention also relates to a device for carrying out the above process, which device comprises, downstream from the incineration plant, an indirect condensation heat exchanger, through which the fumes to be treated pass from top to bottom and which is extended at its lower portion by a device for washing the fumes leaving this heat exchanger.

BRIEF DESCRIPTION OF THE DRAWING

The other characteristics and advantages will become evident in the course of the description which follows and is given with reference to the single appended drawing which is solely given by way of example and shows a diagram of the treatment device according to the invention.

DETAILED DESCRIPTION OF THE INVENTION

As can be seen on the single figure, a device according to the invention consists of an upper portion 1, where the condensation process by indirect heat exchange takes place, and of a lower portion 2 where the washing of the fumes coming from the upper portion 1 takes place.

The upper portion 1 contains a heat exchanger, such as described in French Patent 2,592,812.

Thus, this upper portion 1 consists of an external jacket 3, which is, for example, rectangular and houses a funnel 4 for the incoming fumes to be treated, which are produced by an incineration plant which is not shown.

Below this funnel 4, within the jacket 3, an indirect heat exchanger 5 is located, which consists, for example, of a plurality of tubes forming a bundle inside which a cooling fluid is circulated.

The lower portion 2 which is connected to the upper portion 1 by a zone 6 through which the liquid condensed in the exchanger 5 flows, contains a packing substance 8 inside a jacket 7.

This packing substance 8 can consist, for example, of metal or plastic grids or rings.

Preferably, in order to be acid-resistant, the packing substance 8 is a plastic material, such as, for example, polypropylene.

Below this packing substance 8 a storage tank 9 for the condensed liquid is provided inside the jacket 7 with an overflow device 10.

Between the lower portion of the packing substance 8 and the overflow vessel 10, a pipe 11 for removing the fumes emerges from the jacket 7.

According to an advantageous feature of the invention, the jackets 3 and 7 and flow zone 6 form a single wall of uniform cross-section.

In this manner, the condensate formed by the heat exchanger 5 flows uniformly from jacket 3 to jacket 7 and is thus distributed uniformly on the entire upper surface of the packing substance 8.

According to a variation of the invention, a recycling device 12 allows a portion of the condensed liquid collected in the tank 9 above the packing substance 8 to be recycled from this tank into the flow zone 6.

For uniform distribution of the liquid recycled by the recycling device 12 at the upper surface of the packing substance 8, a spray device 13 or a set of holes or overflow in a pipe or any other device for distributing liquids is provided.

Hereinafter, the mode of operation of the device described above will be described.

The fumes to be treated arrive at a temperature between 220° C. and 300° C. at the heat exchanger 5 via the funnel 4. There, in accordance with the condensation process described in French Patent 2,592,812, the water present in the fumes condenses and traps the gaseous hydrochloric acid present in the fumes.

Thus, with the fumes to be treated and the condensate flowing from top to bottom, a mixture consisting of gaseous HCl-depleted fumes and HCl-enriched water flows below exchanger 5 into flow zone 6.

These fumes can be saturated or unsaturated with water vapour.

At the outlet of exchanger 5, the fumes therefore contain water vapour having a partial pressure $p_{H2O}$ and gaseous HCl of partial pressure $p_{HCl}$. As for the condensate, it consists of water of vapour pressure $p_{sH2O}$ which is less than or equal to $p_{H2O}$ and of hydrochloric acid of vapour pressure $p_{sHCl}$, which is less than $p_{HCl}$.

Since this mixture is circulated in the packing substance, the liquid phase and gas phase make intimate contact, thus promoting the exchange of material from the gas into the liquid and heat exchange between the cold condensate and the hotter fumes, while the condensate is used as washing liquid for the fumes.

Thus, the amount of HCl present in the fumes is lowered through absorption by the condensate.

As a variation, recycling of the condensate from tank 9 onto the upper surface of the packing substance 8 is employed, the recycled condensate also being used in this case as washing liquid for the fumes. Thus, the exchange of material is increased and thus the concentration of the condensate (which is low at the outlet of heat exchanger 5) is increased.

Upon leaving the packing substance 8, large drops of condensate are formed which can be easily trapped by gravity.

In certain cases, it may be useful to provide a device for breaking up vesicles, of known type, at the outlet of the evacuation pipe 11.

According to another variation of the invention, it is possible to remove $SO_2$.

Indeed, condensation exchangers are known for trapping very little $SO_2$ because of the pH of the condensate. This is due to the fact that the vapour pressure of $SO_2$ above the condensate rapidly approaches the partial pressure of $SO_2$ in the fumes. Moreover, the resistance to transferring into the liquid phase is high. Thus, the trapping efficiency for $SO_2$ is low, even if the exchanger is large, this being independent of the trapping efficiency for HCl.

By means of the device according to the invention consisting of a condensation exchanger extended by a packing substance and having a recycling system for the condensate, as described above, it is possible to add alkaline products to the recycled condensate which increase the pH of the condensate and thus lower the vapour pressure of saturation of $SO_2$, which increases the trapping efficiency for $SO_2$ correspondingly.

By means of a device of the type described, which functions according to the invention, fumes have therefore been obtained which leave again through pipe 11 at HCl contents which are below 50 mg/Nm$^3$ at a fume throughput of 5,000 Nm$^3$/hour, at a packing height of 1.2 meters and a throughput of recycled condensate of 2 to 4 m$^3$/hour, the throughput of condensate actually removed being 0.4 m$^3$/h.

Due to the washing of the fumes leaving the heat exchanger device, which is effected by the condensate produced by this device, it is possible to achieve efficient washing of these fumes, while nevertheless avoiding the use of an additional washing liquid, which minimises the volume of liquid effluents to be treated.

We claim:

1. A process for reducing a soluble acidic pollutant content in water formed from fumes discharged from an incineration plant, said process comprising the steps of:
   cooling said fumes, as said fumes pass downwardly, by means of an indirect heat exchange with a cold fluid, to thereby produce a condensate containing acidic pollutants, and after the cooling step, with said fumes still containing acidic pollutants;
   washing said fumes by using said condensate as a washing liquid, said washing of said fumes taking place in a packing substance as said fumes and said condensate pass downwardly through said packing substance and in close contact with each other, to thereby promote an exchange of acidic pollutants from said fumes to said condensate.

2. The process according to claim 1, further comprising the step of recycling the condensate after passing through said packing substance in said washing step for washing said fumes and using said recycled condensate as said washing liquid.

3. A device for reducing a soluble acidic pollutant content in water formed from fumes discharged from an incineration plant, said device comprising three successive portions located downstream from said incineration plant, the three portions including:
   a) an upper portion comprised by a first external jacket containing an indirect condensation heat exchanger through which the fumes to be treated pass downwardly from top to bottom, to thereby produce a condensate containing acidic pollutants;
   b) a lower portion comprised by a second external jacket which is connected to said upper portion and which contains a packing substance for washing said fumes which have already passed down through said indirect condensation heat exchanger, said condensate serving as a washing liquid; and
   c) an intermediate flow portion formed between said upper and lower portions and through which the condensate flows;
   d) wherein said first and second external jackets and said intermediate flow portion form a single wall having uniform cross-section, to attendantly allow the condensate produced by said indirect condensation heat exchanger to flow evenly from said first external jacket to said second external jacket thereby promoting a uniform distribution of the condensate over an entire upper surface area of said packing substance.

4. The device according to claim 3, further comprising means for collecting the condensate, said condensate collecting means being disposed below said packing substance.

5. The device according to claim 4, further comprising means, disposed in said intermediate flow portion, for redistributing the condensate collected in said condensate collecting means onto an upper surface of said packing substance.

6. The device according to claim 5, wherein said redistributing means comprises a spray device, said spray device being connected to a recycyling device for recycling a portion of the condensate collected in said condensate collecting means up to said spray means.

7. The device according to claim 3, wherein said upper portion further comprises a funnel for incoming fumes and which is disposed above said indirect condensation heat exchanger.

* * * * *